(12) United States Patent
Ai et al.

(10) Patent No.: US 8,092,332 B2
(45) Date of Patent: *Jan. 10, 2012

(54) THREE SHAFT FRICTION DRIVE UNIT

(75) Inventors: Xiaolan Ai, Massillon, OH (US); Gerald Fox, Massillon, OH (US)

(73) Assignee: The Timken Company, Canton, OH (US)

( * ) Notice: Subject to any disclaimer, the term of this patent is extended or adjusted under 35 U.S.C. 154(b) by 402 days.

This patent is subject to a terminal disclaimer.

(21) Appl. No.: 12/514,546

(22) PCT Filed: Dec. 19, 2007

(86) PCT No.: PCT/US2007/088146
§ 371 (c)(1),
(2), (4) Date: May 12, 2009

(87) PCT Pub. No.: WO2008/082991
PCT Pub. Date: Jul. 10, 2008

(65) Prior Publication Data
US 2009/0291797 A1 Nov. 26, 2009

Related U.S. Application Data

(60) Provisional application No. 60/882,362, filed on Dec. 28, 2006.

(51) Int. Cl.
*F16H 13/14* (2006.01)
(52) U.S. Cl. ...................................................... 475/195
(58) Field of Classification Search .................... None
See application file for complete search history.

(56) References Cited

U.S. PATENT DOCUMENTS

| 3,364,761 | A | * | 1/1968 | Nasvytis | 476/61 |
| 3,367,214 | A | * | 2/1968 | Nasvytis | 475/183 |
| 4,487,090 | A | * | 12/1984 | Burnham | 475/183 |
| 5,122,099 | A | | 6/1992 | Boedo et al. | |
| 2009/0124447 | A1 | * | 5/2009 | Marumoto | 475/195 |
| 2010/0050998 | A1 | * | 3/2010 | Ai et al. | 123/565 |

FOREIGN PATENT DOCUMENTS

| JP | 58 180868 | 10/1983 |
| JP | 59 226752 | 12/1984 |
| WO | WO 02/21017 | 3/2002 |
| WO | WO 03/064891 | 8/2003 |
| WO | WO 2008/024895 | 2/2008 |

OTHER PUBLICATIONS

Communication pursuant to Article 94(3) EPC, dated Dec. 29, 2009, for Appln. No. 07 855 267.6 - 2421; 3 pages.
PCT/US07/088146 Search and Written Opinion Dated Apr. 24, 2009.

* cited by examiner

*Primary Examiner* — Dirk Wright
(74) *Attorney, Agent, or Firm* — Polster Lieder Woodruff & Lucchesi, L.C.

(57) ABSTRACT

A friction drive (10) having a plurality of planet assemblies (24A, 24B, 24C) pivotally mounted to a carrier (12), a sun shaft (14) rotatably mounted with the carrier (12) and having a first raceway (16), and an outer ring member (18) having a second raceway (22) concentric to the first raceway (16) and having a ring shaft (20). The plurality of planet assemblies (24A, 24B, 24C) frictionally engaged with the first raceway (16) and the second raceway (22) for transferring power between the sun shaft (14) and the outer ring member (18).

18 Claims, 7 Drawing Sheets

US 8,092,332 B2

THREE SHAFT FRICTION DRIVE UNIT

CROSS-REFERENCE TO RELATED APPLICATIONS

This application derives and claims priority from International Application PCT/US2007/088146, filed Dec. 19, 2007, and published under International Publication Number WO 2008/082991, and from U.S. provisional application 60/882,362, filed Dec. 28, 2006.

BACKGROUND ART

The invention is related in general to planetary friction drive transmissions, and in particular to three shaft double wedge friction drives.

Friction drives utilize friction force to transmit torque and power. Typically, the friction force within a friction drive is generated at the interfaces of two generally smooth continuous surfaces, which are usually separated by a thick layer of lubricant. Friction drives possess certain features and advantages over other types of drives, such as gear drives. These advantages include smooth and quiet operation, small backlash, high operation, and low manufacturing cost.

Various types of friction drives are known in the art, such as "zero-spin" friction drives. Among "zero-spin" friction drives, the simplest design is perhaps the eccentric planet drive. While eccentric planet drives offer an effective self-loading mechanism known as wedge loading, the eccentric nature of the drive significantly confines its applications to two shaft transmissions. However, power control systems such as variable speed superchargers or turbochargers, utilize three shaft planetary systems with concentric shafts. Therefore, developing a cost effective concentric planetary friction drive is of great importance for these power control systems, particularly those operated at elevated speeds.

BRIEF DESCRIPTION OF THE DRAWINGS

In the accompanying drawings which form part of the specification.

Corresponding reference numerals indicate corresponding parts throughout the several figures of the drawings.

BEST MODES FOR CARRYING OUT THE INVENTION

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 2:
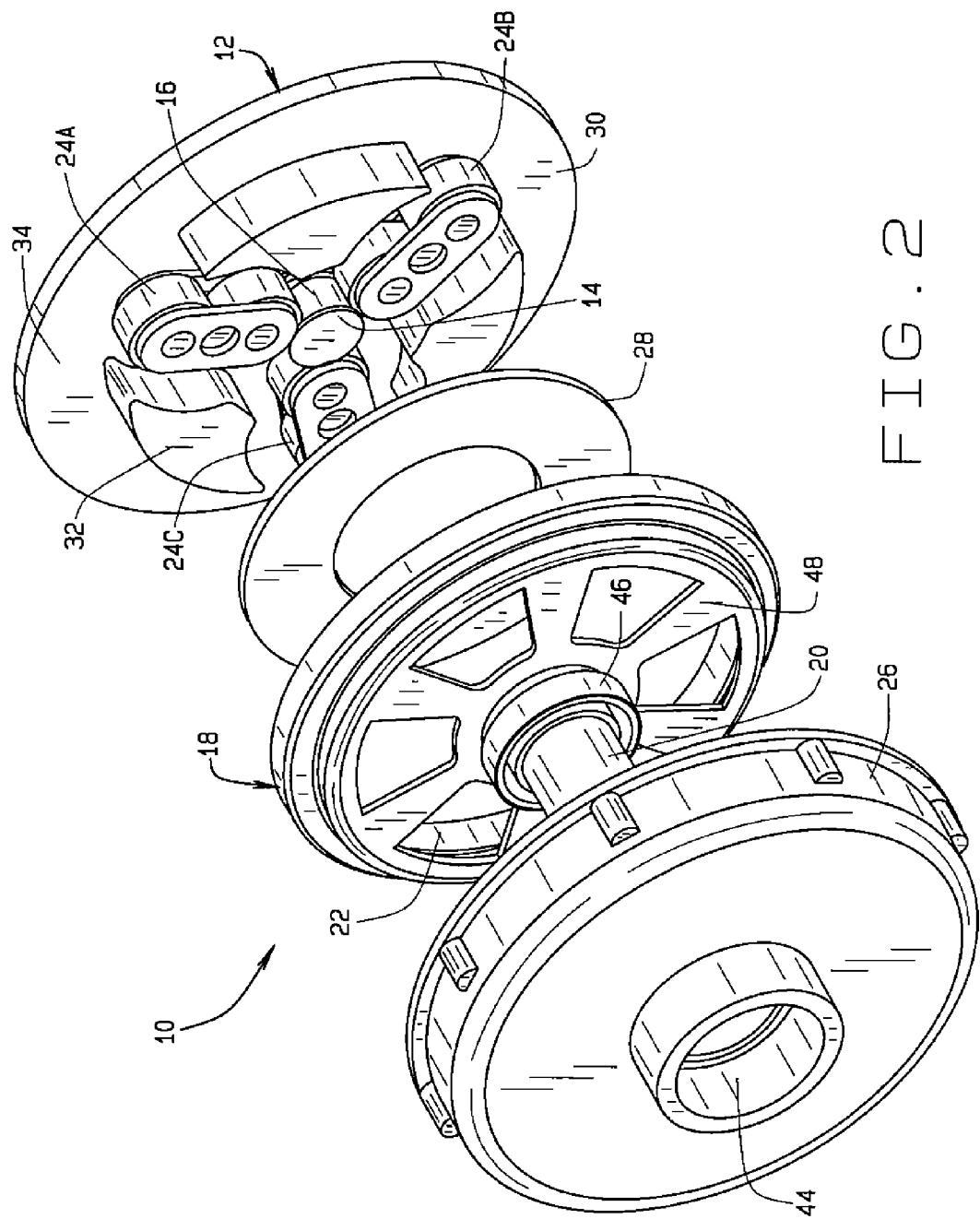
FIG. 2 is an exploded perspective view of the friction drive.
Figure 3:
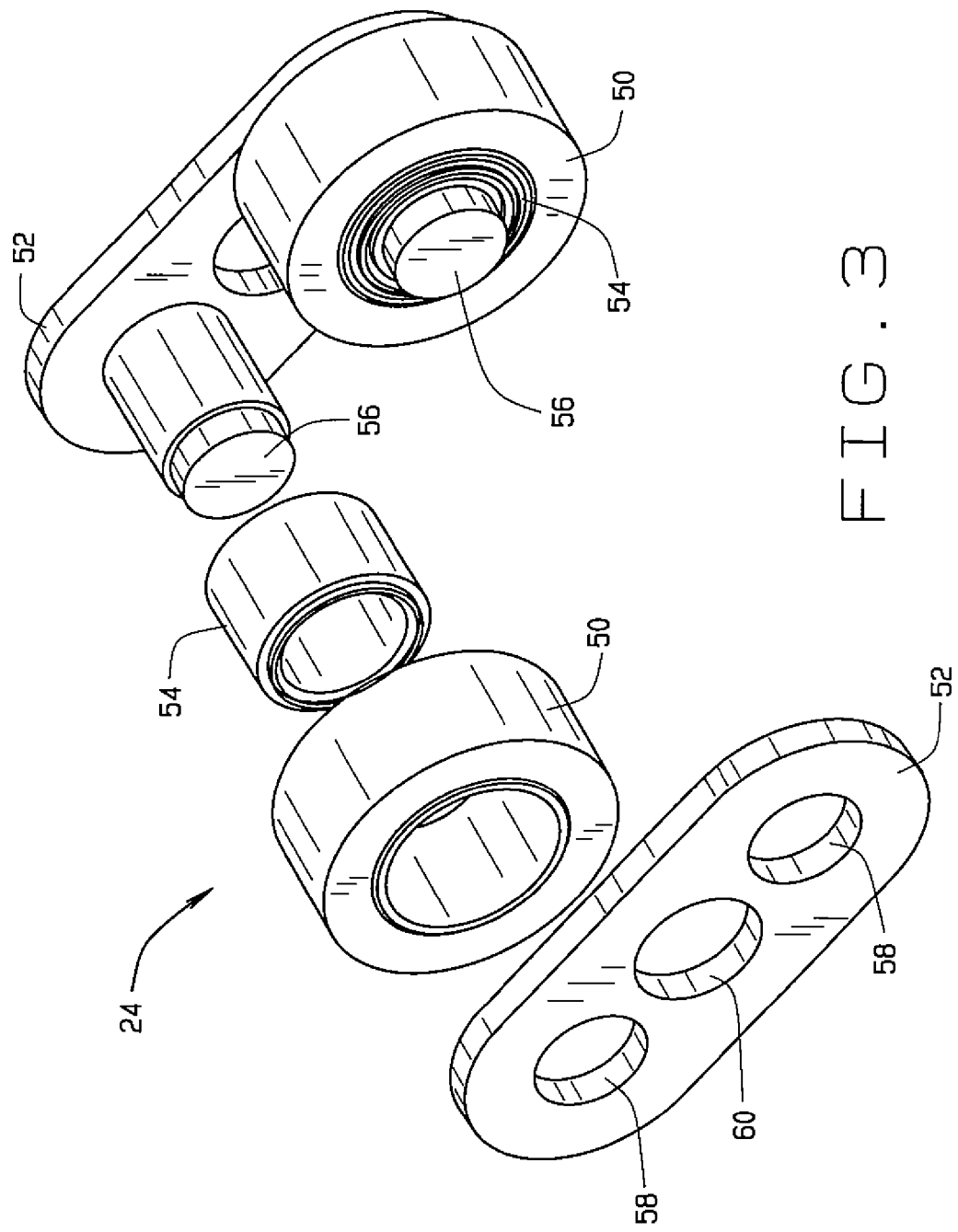
FIG. 3 is an exploded perspective view of a planet assembly.
Figure 4:
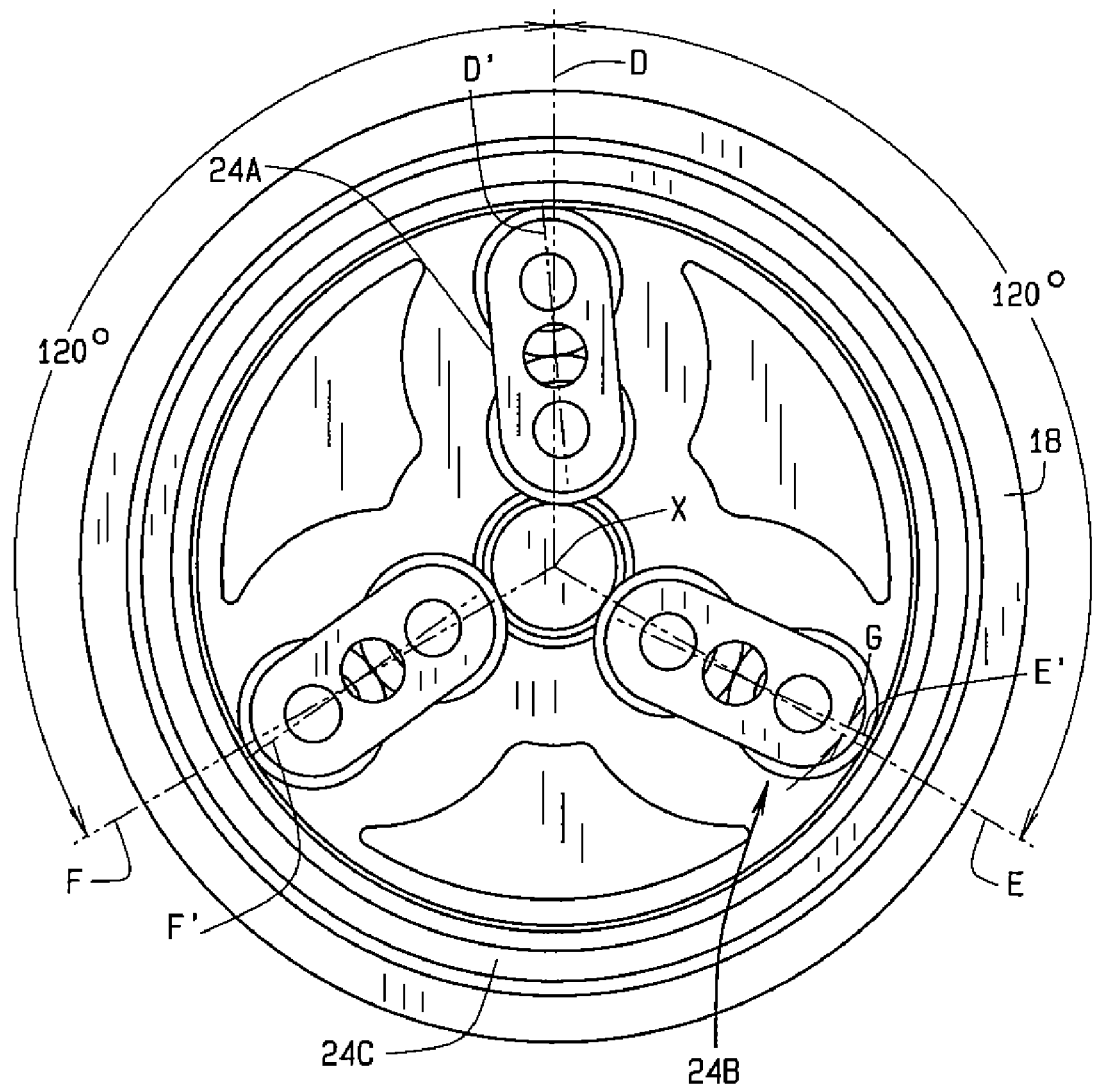
FIG. 4 is a sectional view of the friction drive of FIG. 2.
Figure 5:
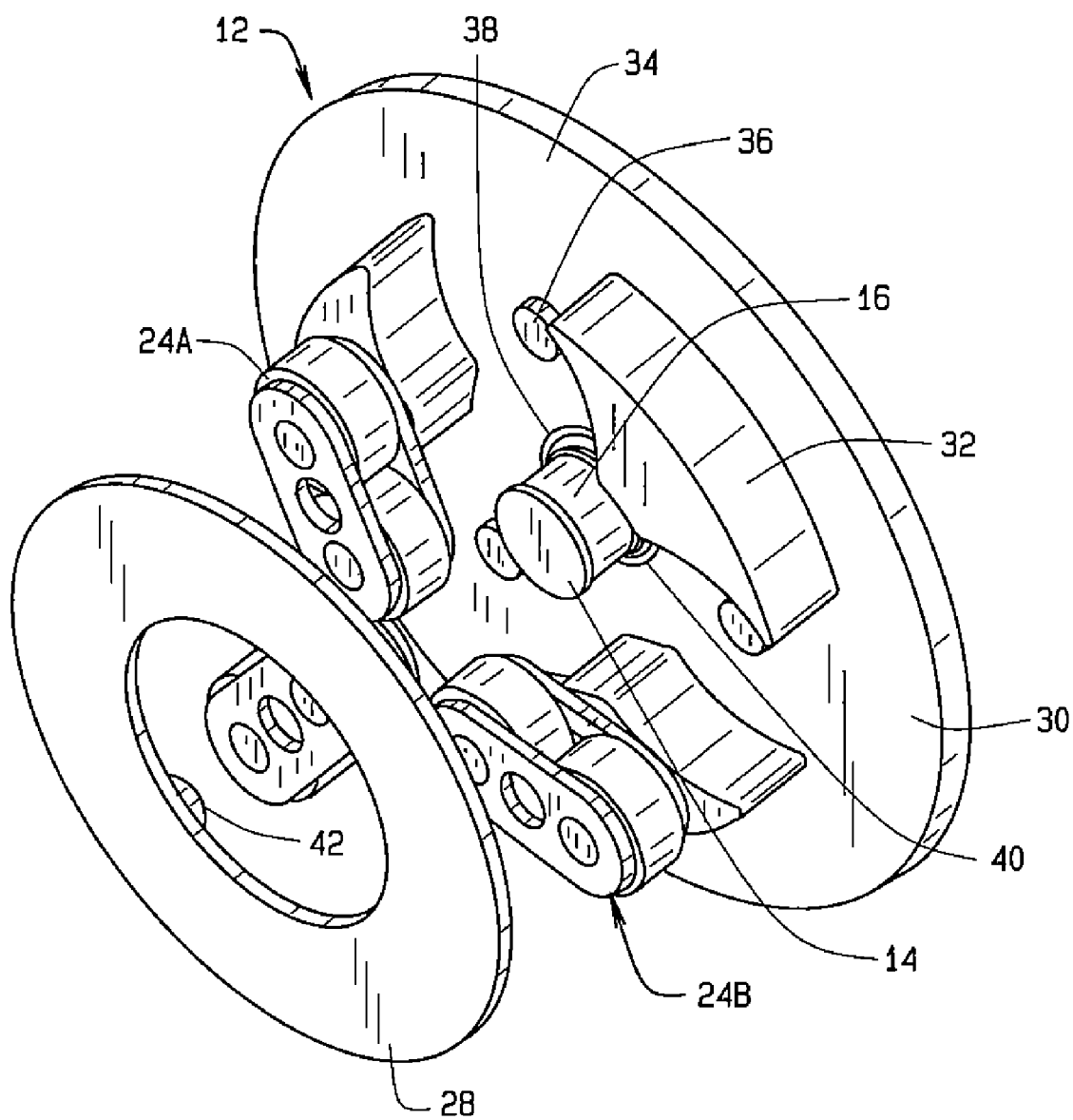
FIG. 5 is an exploded perspective view of a carrier assembly.
Figure 6:
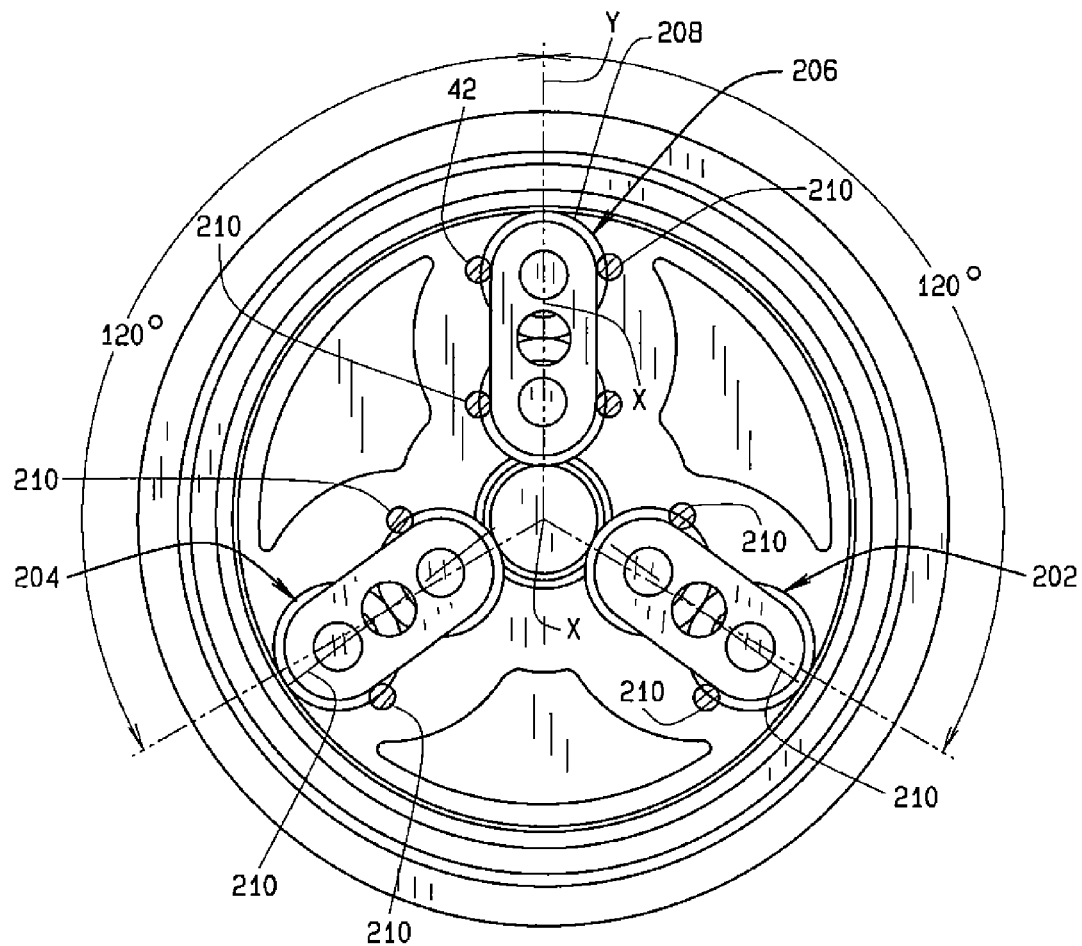
FIG. 6 is a section view of a first alternate embodiment of a friction drive.

As shown in FIGS. 1-7, an embodiment of the present invention, generally referred to as a friction drive 10, includes a carrier assembly 12, a sun shaft 14 having a first raceway 16, an outer ring member 18 having a ring shaft 20 with a second raceway 22 concentric with the first raceway 16, and three planet assemblies 24A, 24B, and 24C engaged between the first raceway 16 and second raceway 22 for transferring power and torque. The carrier assembly 12, the ring shaft 20 and the sun shaft 14 comprise three rotatable shafts that are aligned along the same longitudinal center axis X (FIGS. 4 and 6).

The carrier assembly 12 includes a cover 26, a carrier plate 28, and a base 30 (FIG. 5). The base 30 is a generally circular plate having three arcuately shaped wedges, hereby referred to as islands 32, extending from a front face 34. The islands 32 function as spacers between the base 30 and the carrier plate 28, thereby, defining cavities for receiving the planet assemblies 24A, 24B, and 24C. Protrusions 36 also extend from the front face 34 for mating with the planet assemblies 24A, 24B, and 24C. The base 30 defines a bore 38 for supporting the sun shaft 14 via a bearing 40. The carrier plate 28 is a generally ring-shaped plate with protrusions 42 extending from a back face for mating with the planet assemblies 24A, 24B, and 24C. The position of the plate protrusions 42 generally corresponds with the position of the base protrusions 36 on the base 30, so that the protrusions 36 and 42 can pivotally mate and support with the planet assemblies 24A, 24B, and 24C. The carrier plate 28 attaches to the islands 32 with any appropriate mechanical means, such as welding, adhesive, fasteners, and the like. Once the planet assemblies 24A, 24B, and 24C are assembled within the carrier assembly 12, they can pivot about the protrusions 36 and 42 to generate a wedged engagement with the first raceway 16 and second raceway 22 under an applied torque load. The cover 26 is cylindrical with a bore 44 for receiving and supporting the ring shaft 20 via a bearing 46 (FIG. 2). The cover 26 mates with the base 30 with any appropriate mechanical means, such as an interference fit, welding, adhesive, fasteners, and the like.

The outer ring member 18 is generally ring shaped having the second raceway 22 concentric to the first raceway 16 of the sun shaft 14 for engaging the planet assemblies 24A, 24B, and 24C (FIG. 2). The outer ring member 18 includes the ring shaft 20 for transferring power and spokes 48 connecting the second raceway 22 to the ring shaft 20 to accommodate any misalignment between the ring shaft 20 and the second raceway 22.

Each planet assembly 24A, 24B, and 24C comprises two planet rollers 50 supported between planet plates 52 by bearings 54 and pin shafts 56 so that the rollers 50 rotate freely (FIG. 3). The pin shafts 56 are secured at both ends to the pin holes 58 of the planet plates 52 by an appropriate mechanical means, such as welding or an interference fit. Each planet plate 52 defines a bore 60 positioned generally at the center of the plate 52 for pivotally mounting the planet assembly 24 with the protrusions 36 and 42 of the carrier assembly 12.

As shown in FIG. 4, the three planet assemblies 24A, 24B, and 24C are assembled with corresponding orientations relative to respective reference lines D, E, and F extending outwardly from axis X, which are equally spaced at about 120°. In other words, the longitudinal axis of each planet assembly D', E' and F' is orientated at generally the same angle G relative to respective reference lines D, E, and F. In this configuration, the friction drive 10 is capable of transferring torque in primarily one direction, which is shown as clockwise in FIG. 4. This is the direction in which the applied torque causes a wedged engagement between the planet assemblies 24A, 24B, and 24C and the first raceway 16 and second raceway 22. When the applied torque acts in the opposite direction, the torque generates no wedged engagement.

Figure 1:
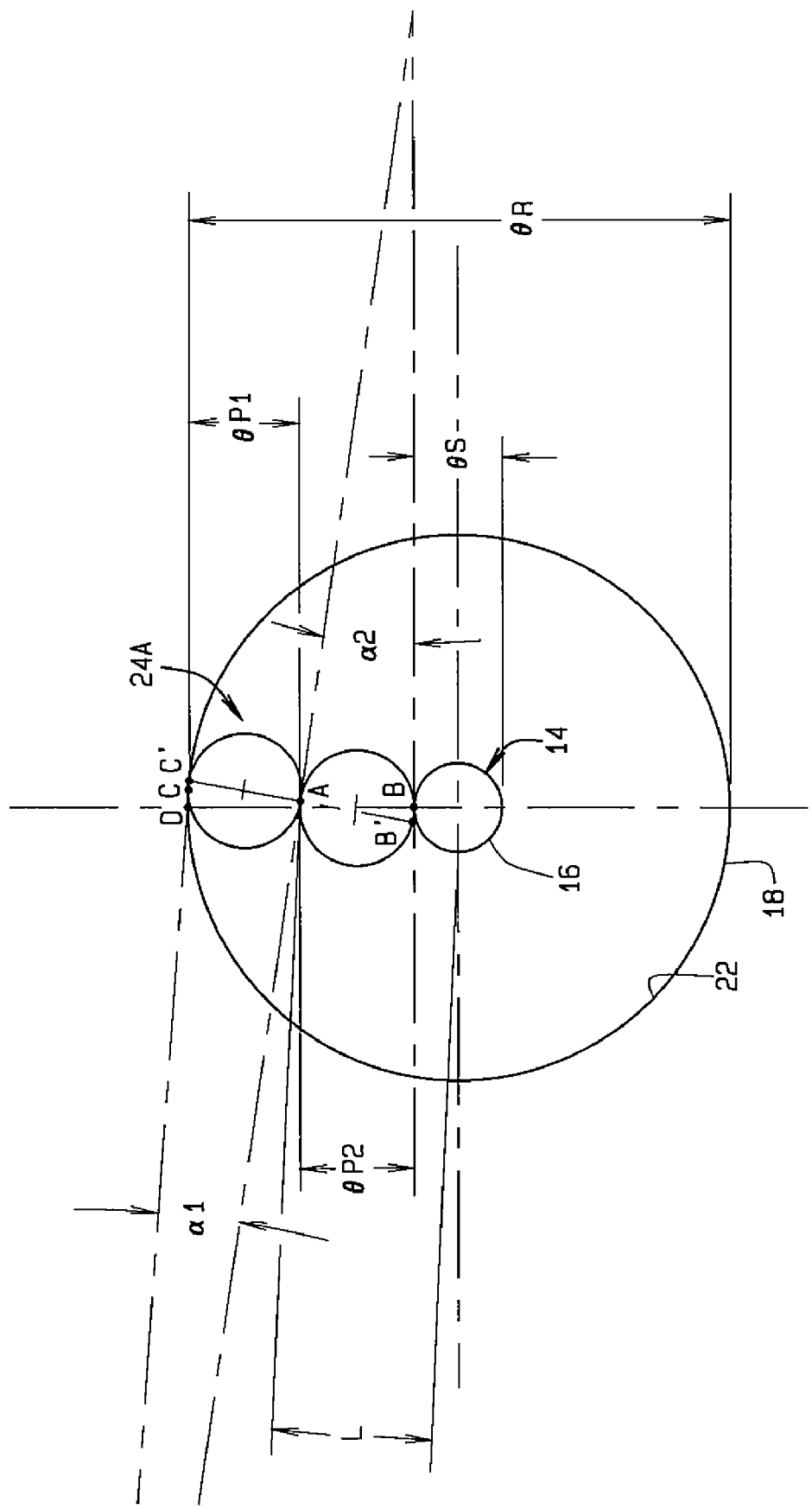
FIG. 1 is a diagram showing the frictional contact in a friction drive of the present invention.

When assembled, the planet rollers 50 of each planet assembly 24A, 24B, and 24C are in frictional contact with each other at point A (FIG. 1). One of the planet rollers 50 is in frictional contact with the first raceway 16 of the sun shaft 14 at point B. The other planet roller 50 is in frictional contact with the second raceway 22 of the outer ring member 18 at point C. Points A, B, and C do not lie along a linear axis relative to the center points of the planet rollers. A tangent line from point A to point C form the first wedged engagement with wedging angle a1. A tangent line from point A to point B form the second wedged engagement with wedging angle a2. For the self-load wedged engagement to be effective, it is recommended that the following conditions hold true:

$$\tan(\alpha 1) \leq \mu \quad (1)$$

$$\tan(\alpha 2) \leq \mu \quad (2)$$

where $\mu$ is the friction coefficient at the friction contact points.

The maximum distance (C'B') between the contact point C', the planet roller 50 in contact with the first raceway 16, and the contact point B', the other planet in contact with the second raceway 22, is no less than the distance (BD) between the first raceway 16 and the second raceway 22. Therefore, as the friction drive 10 is operated with torque applied in a certain direction (shown as clockwise in FIG. 1), the friction forces at the contact points B' and C' form a force-couple, pivoting the planet assemblies 24A, 24B, and 24C and wedging them against the first raceway 16 and second raceway 22. The wedged engagement is in proportion to the applied torque. If the conditions set forth by equations (1) and (2) hold, there will be no excessive slip at the frictional contact points B' and C'.

The present invention can be embodied in the form of FIG. 6, which make the friction drive 200 capable of transferring torque in either direction. In, FIG. 6, shows the friction drive includes at least two wedging planet assemblies 202 and 204 arranged to oppose each other. In this configuration, a third supporting planet assembly 206 is used to balance the internal forces by having a planet roller 208 of a slightly smaller size than the planet rollers 210 of the wedging planet assemblies 202 and 204. The supporting planet assembly 206 is arranged with its center line X aligned with the reference line Y. To ensure that the planet assemblies 202 and 204 remain at a predetermined position, locking pins 210 fixed to carrier base 212 and carrier plate 214 are used to limit the movement of the supporting planet assembly from pivoting about the protrusions 216 in either direction. In this way, the wedging planet assemblies 202 and 204 are directionally locked, allowing them to pivot only in their respective wedge directions. In FIG. 6, the locking pins 210 limit the planet assembly 202 and 204 from pivoting in clockwise direction. Rather, locking pins 210 confine the prevent planet assemblies 202 and 204 to rotation in counter-clockwise direction.

Figure 7:
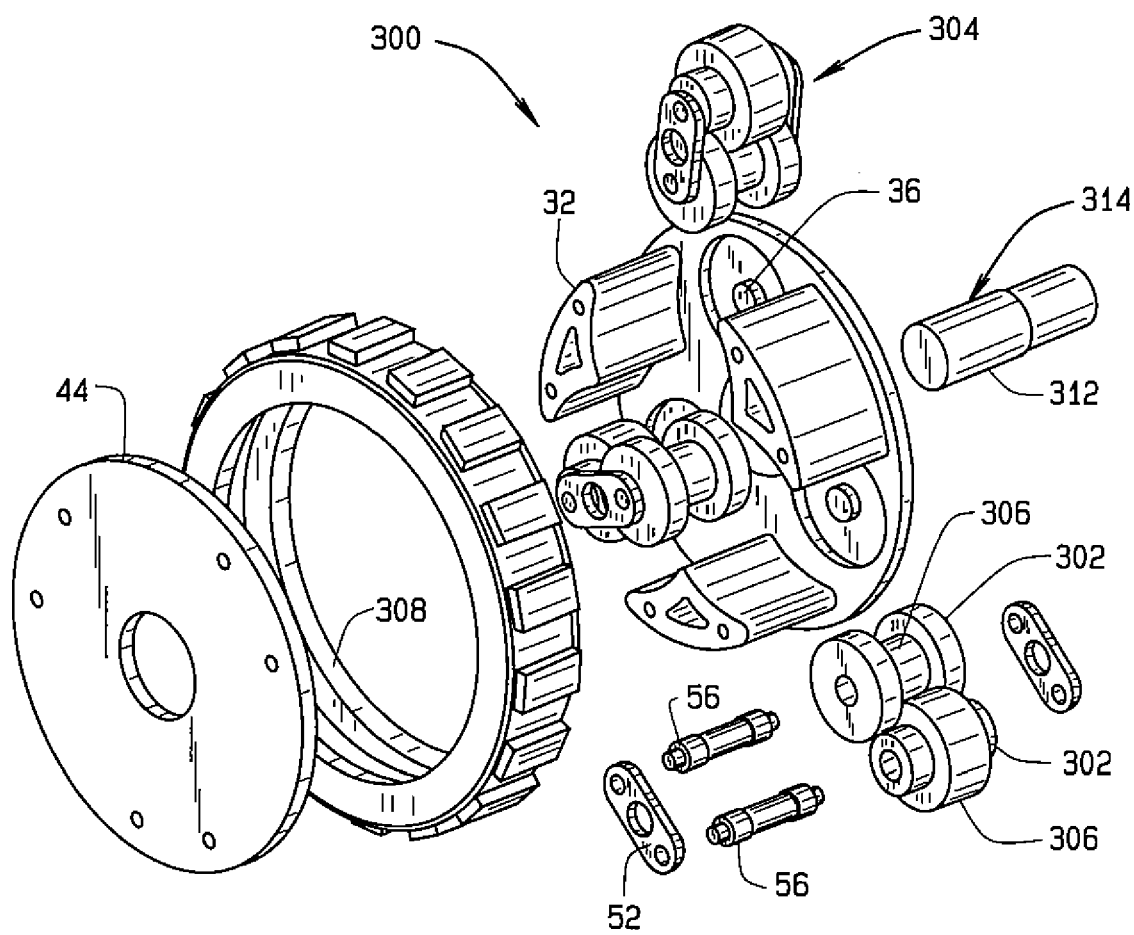
FIG. 7 is an exploded perspective view of a second alternate embodiment of a friction drive.

The present invention can also be embodied in the form of FIG. 7 which illustrates stepped rollers 302 used to alter (increase or decrease) the base speed ratio of the friction drive 300. Each stepped roller 302 in the planet assembly 304 has two outer surfaces 306. One being in contact with the mating planet roller 302, the other being in contact with either the second raceway 308 of the ring member 310 or the first raceway 312 of the sun shaft 314. The planet assemblies 304 can be arranged in the similar way as described above to facilitate uni-directional or bi-directional torque transfer.

For high speed application, all components and assemblies may be balanced under operating conditions to reduce vibration.

Changes can be made in the above constructions without departing from the scope of the invention, it is intended that all matter contained in the above description or shown in the accompanying drawings shall be interpreted as illustrative and not in a limiting sense.

The invention claimed is:

1. A friction drive, comprising:
   a carrier having a center axis;
   a sun shaft rotatably supported by the carrier and positioned along the center axis, the sun shaft having a first raceway;
   a outer ring member having a second raceway concentric to the first raceway and positioned along the center axis, the outer ring having a ring shaft positioned along the center axis;
   a plurality of planet assemblies pivotally mounted to the carrier to frictionally engage with the first raceway and the second raceway in a wedged engagement for transferring power between the sun shaft and the outer ring member;
   wherein the plurality of planet assemblies frictionally engage the first raceway and second raceway to satisfy the equations $\tan(\alpha 1) \leq \mu$ and $\tan(\alpha 2) \leq \mu$;
   wherein $\mu$ is the friction coefficient at the friction contact points;
   wherein $\alpha 2$ is a first wedge angle associated with the planet assemblies and the first raceway; and
   wherein $\alpha 1$ is a second wedge angle associated with the planet assemblies and the second raceway.

2. The friction drive of claim 1, wherein each planet assembly comprises:
   a pair of planet plates having a center axis;
   a pair of planet rollers pivotally mounted to opposite ends of the planet plates; and
   wherein the planet assembly pivotally mounts to the carrier assembly at about the center axis of the planet plates.

3. The friction drive of claim 2, wherein the pair of planet rollers comprise:
   a first planet roller having a stepped outer surface; and
   a second planet roller having a stepped outer surface opposed to the stepped outer surface of the first planet roller for mating between the first planet roller and the second planet roller.

4. The friction drive of claim 1, wherein the plurality of planet assemblies are equally spaced about the center axis of the carrier.

5. The friction drive of claim 1, wherein the plurality of planet assemblies are positioned to pivot between a wedged engagement position with the first raceway and the second raceway as the outer ring rotates in a first direction and a disengaged position in a wedged engagement as the outer ring rotates in an opposite second direction.

6. The friction drive of claim 1, wherein the plurality of planet assemblies comprise;
   a supporting planet assembly with a longitudinal axis positioned along a radial line extending from the center axis of the carrier to frictionally engage with the first raceway and second raceway for self-balancing internal forces;
   a pin mounted to the carrier and positioned to limit the pivotal movement of the supporting planet assembly; and
   a pair of wedge planet assemblies pivotally mounted to the carrier; and pins mounted to the carrier to limit the pivotal movement of the wedge planet assemblies.

7. A friction drive system, comprising:
a carrier having a center axis;
a sun shaft rotatably supported by the carrier, and positioned along the center axis, the sun shaft having a first raceway;
a outer ring member having a second raceway concentric to the first raceway and positioned along the center axis, the outer ring having a ring shaft positioned along the center axis;
a plurality of planet assemblies pivotally mounted to the carrier to frictionally engage with the first raceway and the second raceway in a wedged engagement for transferring power between the sun shaft and the outer ring member;
a motor connectable to one of the sun shaft, the ring shaft, and carrier;
wherein the plurality of planet assemblies frictionally engage the first raceway and second raceway to satisfy the equations $\tan(\alpha 1) \leq \mu$ and $\tan(\alpha 2) \leq \mu$;
wherein $\mu$ is the friction coefficient at the friction contact points;
wherein $\alpha 2$ is a first wedge angle associated with the planet assemblies and the first raceway; and
wherein $\alpha 1$ is a second wedge angle associated with the planet assemblies and the second raceway.

8. The friction drive of claim 7, wherein each planet assembly comprises:
a pair of planet plates having a center axis;
a pair of planet rollers pivotally mounted to opposite ends of the planet plates; and
wherein each planet assembly pivotally mounts to the carrier assembly at about the center axis of the planet plates.

9. The friction drive of claim 8, wherein the pair of planet rollers comprise:
a first planet roller having a stepped outer surface; and
a second planet roller having a stepped outer surface opposed to the stepped outer surface of the first planet roller for mating between the first planet roller and the second planet roller.

10. The friction drive of claim 7, wherein the plurality of planet assemblies are equally spaced about the center axis of the carrier.

11. The friction drive of claim 7, wherein the plurality of planet assemblies are positioned to pivot between a wedged engagement position with the first raceway and the second raceway as the outer ring rotates in a first direction and a disengaged position in a wedged engagement as the outer ring rotates in an opposite second direction.

12. The friction drive of claim 7, wherein the plurality of planet assemblies frictionally engage the first raceway and second raceway to satisfy the equations $\tan(\alpha 1) \leq \mu$ and $\tan(\alpha 2) \leq \mu$;
wherein $\mu$ is the friction coefficient at the friction contact points;
wherein $\alpha 2$ is a first wedge angle associated with the planet assemblies and the first raceway; and
wherein $\alpha 1$ is a second wedge angle associated with the planet assemblies and the second raceway.

13. The friction drive of claim 7, wherein the plurality of planet assemblies comprise;
a supporting planet assembly with a longitudinal axis positioned along a radial line extending from the center axis of the carrier to frictionally engage with the first raceway and second raceway for self-balancing internal forces;
a pin mounted to the carrier and positioned to limit the pivotal movement of the supporting planet assembly; and
a pair of wedge planet assemblies pivotally mounted to the carrier;
pins mounted to the carrier to limit the pivotal movement of the wedge planet assemblies.

14. A friction drive, comprising:
a carrier having a center axis;
a sun shaft rotatably supported by the carrier, the sun shaft having a first raceway;
a outer ring member having a second raceway concentric to the first raceway, the outer ring having a ring shaft;
a plurality of planet assemblies pivotally mounted to the carrier to frictionally engage with the first raceway and the second raceway in a wedged engagement for transferring power between the sun shaft and the outer ring member;
wherein the sun shaft, the outer ring member, and ring shaft are positioned along the center axis of the carrier;
wherein the plurality of planet assemblies frictionally engage the first raceway and second raceway to satisfy the equations $\tan(\alpha 1) \leq \mu$ and $\tan(\alpha 2) \leq \mu$;
wherein $\mu$ is the friction coefficient at the friction contact points;
wherein $\alpha 2$ is a first wedge angle associated with the planet assemblies and the first raceway; and
wherein $\alpha 1$ is a second wedge angle associated with the planet assemblies and the second raceway.

15. The friction drive of claim 14, wherein each planet assembly comprises:
a pair of planet plates having a center axis;
a pair of planet rollers pivotally mounted to opposite ends of the planet plates; and
wherein the planet assembly pivotally mounts to the carrier assembly at about the center axis of the planet plates.

16. The friction drive of claim 15, wherein the pair of planet rollers comprise:
a first planet roller having a stepped outer surface; and
a second planet roller having a stepped outer surface opposed to the stepped outer surface of the first planet roller for mating between the first planet roller and the second planet roller.

17. The friction drive of claim 14, wherein the plurality of planet assemblies are positioned to pivot between a wedged engagement position with the first raceway and the second raceway as the outer ring rotates in a first direction and a disengaged position in a wedged engagement as the outer ring rotates in an opposite second direction.

18. The friction drive of claim 14, wherein the plurality of planet assemblies comprise;
a supporting planet assembly with a longitudinal axis positioned along a radial line extending from the center axis of the carrier to frictionally engage with the first raceway and second raceway for self-balancing internal forces;
a pin mounted to the carrier and positioned to limit the pivotal movement of the supporting planet assembly; and
a pair of wedge planet assemblies pivotally mounted to the carrier;
pins mounted to the carrier to limit the pivotal movement of the wedge planet assemblies.

* * * * *